3,131,227
NEW POLYALKYLCYCLOPENTADIENES

Louis de Vries, Kentfield, Calif., assignor to California Research Corporation, San Francisco, Calif., a corporation of Delaware
No Drawing. Filed Sept. 26, 1960, Ser. No. 58,191
3 Claims. (Cl. 260—666)

The present invention relates to the preparation of penta- and hexa-alkylcyclopentadienes and certain derivatives thereof. More particularly, it relates to new compounds, pentamethylcyclopentadiene and hexamethylcyclopentadiene and to their various derivatives.

In the co-pending application Serial No. 58,209 filed on September 26, 1960, the filing date of the present application, there is disclosed preparation of certain alcohols and ketones suitable for conversion to new, heretofore unknown diene materials, the esters and salts of which can be useful in the manufacture of plasticizers, lubricating oil additives, dyes, etc. The aforementioned co-pending application discloses that by reacting tiglaldehyde and 2-butenyl-2-lithium, a carbinol is obtained, namely, di-2-butenyl carbinol, and that upon oxidation, this carbinol yields di-2-butenylketone which in turn is subjected to cyclization in a mixture of phosphoric and formic acids to yield an alcohol, namely, 1,2,3,4,5-pentamethylcyclopent-2-en-1-ol.

I have found that this last-mentioned alcohol, on losing water and upon being distilled in vacuo gives a new kind of diene, namely, 1,2,3,4,5-pentamethylcyclopentadiene.

Preparation of Pentamethylcyclopentadiene

In the actual example, 46.7 g. of the aforementioned cyclic alcohol characterized by a boiling point of 72° C. at 6.2 mm. Hg was treated by adding thereto a few crystals of iodine and warming up gently to 65° C. for 2 hours. The dehydration product was decanted from water, dried over magnesium sulfate and distilled through an 18 inch spinning band column to give pentamethylcyclopentadiene in a 75% yield. This material is a liquid with a boiling point of 58.3° C. at 13.5 mm. Hg and a refractive index $n_D^{20}$ of 1.4748.

Quantitative chemical analysis of this diene gave the following results:

|  | C | H |
|---|---|---|
| Calculated for $C_{10}H_{16}$ | 88.14 | 11.86 |
| Found | 87.89 | 12.02 |

Molecular weight obtained by mass spectrography was 136.

Spectral analysis gave the following results:
Ultraviolet absorption in iso-octane, $\lambda_{max}$ 248.0, 232.0 (shoulder), 265.0 (shoulder) with $\epsilon_{max}$ 3189, 2780, 2730, respectively;

Infrared absorption, vibration frequencies equal to 1653 cm.$^{-1}$ (medium) and 1620$^{-1}$ (weak). The bands characteristic of exocyclic methylene were absent. Vapor phase chromatography indicated the presence of a homogeneous diene material. Thus, the structure of 1,2,3,4,5-pentamethylcyclopentadiene

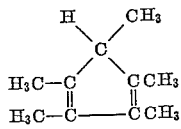

was confirmed.

Preparation of Hexamethylcyclopentadiene

This diene material was prepared from the aforedescribed pentamethylcyclopentadiene by first forming a sodium salt of this latter. 4.26 g. of finely comminuted sodium metal was gradually added with stirring to a 500 ml. 3-neck round-bottom flask provided with a stirrer, Dry-Ice condenser and containing 200 ml. of liquid ammonia and a few crystals of ferric nitrate as a catalyst. After some 30 minutes, the blue coloration disappeared, and a gray suspension of sodamide remained in the flask. Then, 16.8 g. of pentamethylcyclopentadiene was added dropwise under an atmosphere of nitrogen. The liquid turned bright orange-red. After the addition was terminated, stirring was continued for 1½ hours. Thereupon, 26.39 g. of methyl iodide was added dropwise, and pentamethylcyclopentadienyl sodium salt and the excess of sodamide became converted to hexamethylcyclopentadiene, methyl amine and sodium iodide. Ammonia and methyl amine were allowed to evaporate at room temperature from the suspension which was now colored faintly yellow.

Pentane was added to the residue and sodium iodide was removed by filtration. A thorough washing with pentane followed, whereupon pentane was removed in vacuo. The remaining oil was distilled through an 18 inch spinning band column. The ultimate product was recovered in an amount of 13.7 g. It boiled at 52.8° C. at 16.4 mm. Hg and had a refractive index $n_D^{20}$ of 1.4719. The quantitative carbon-hydrogen analysis of this material gave the following values:

|  | C | H |
|---|---|---|
| Calculated for $C_{11}H_{18}$ | 87.92 | 12.08 |
| Found | 87.74 | 11.91 |

The molecular weight by mass spectrography was 150. Spectral analysis results were as follows:
Ultraviolet absorption in iso-octane $\lambda_{max}$ 252.4; $\epsilon_{max}$ 4140;

Infrared absorption, the figures of 1654 cm.$^{-1}$ (medium) and 1620 cm.$^{-1}$ (weak) for vibration frequencies indicated the presence of a C=C—C=C structure. Vapor phase chromatography pointed to the homogeneity of the material.

Thus, the results confirmed the structure of hexamethylcyclopentadiene

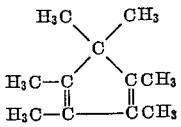

Other penta-alkyl cyclopentadienes and hexaalkylcyclopentadienes may be prepared similarly to the aforementioned pentamethylcyclopentadiene and hexamethylcyclopentadiene, following the procedure described in detail in the co-pending application referred to hereinbefore, Serial No. 58,209, filed September 26, 1960.

When 2-ethylbutene aldehyde is substituted for tiglaldehyde and 2-pentenyl-2-lithium is substituted for 2-butenyl-2-lithium, the resulting diene is 1,3,5-trimethyl-2,4-diethylcyclopentadiene. When ethyl lithium is substituted for methyl lithium in the reaction with 2,3,4,5-tetramethyl-cyclopent-2-en-1-one, the product is 1,2,3,4-tetramethyl-5-ethylcyclopentadiene.

The various penta-alkylcyclopentadienes and hexa-alkylcyclopentadienes, particularly the pentamethylcyclopentadiene and hexamethylcyclopentadiene, represent useful chemical intermediates. In the presence of anions they form carbonium salts which provide stable, highly colored solutions. Thus, addition of triphenylmethylperchlorate to pentamethylcyclopentadiene in acetonitrile solution results in an instantaneous deep purple coloration of the solution. Likewise, addition of acetic acid and of a drop or two of a strong acid, e.g., sulfuric acid, results in a similar purplish color, although at a somewhat slower rate and somewhat less in intensity. Hexamethylcyclopentadiene treated with bromosuccinimide in carbon tetrachloride, on filtering off excess succinimide gives a yellow solution which on addition of aqueous hydrochloric acid is immediately colored deep purple. The same hexamethylcyclopentadiene treated with triphenylmethyl perchlorate imparts an immediate magenta color to the solution. The carbonium salts increase the electrical conductivity of hydrocarbons and, consequently, reduce their tendency to develop a static charge, which fact can be of considerable industrial importance. On being decomposed, these carbonium salts liberate the anion as a free acid and form fulvene-like materials which, owing to their high reactivity, constitute useful intermediates for the purpose of chemical synthesis.

I claim:

1. As a new composition of matter, hexamethylcyclopentadiene having the structural formula

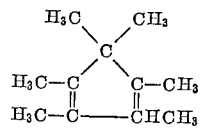

2. The method of producing 1,2,3,4,5-pentamethylcyclopentadienes which comprises dehydrating 1,2,3,4,5-pentamethylcyclopent-2-en-1-ol.

3. The method of producing hexamethylcyclopentadiene which comprises the steps of (A) reacting 1,2,3,4,5-pentamethylcyclopentadiene with sodamide, (B) reacting the resulting sodium salt of pentamethylcyclopentadiene with methyl iodide, and (C) recovering the hexamethylcyclopentadiene product.

References Cited in the file of this patent

UNITED STATES PATENTS

| | | |
|---|---|---|
| 2,818,417 | Brown et al. | Dec. 31, 1957 |
| 2,951,057 | Wiese et al. | Aug. 30, 1960 |
| 2,953,607 | Hafner | Sept. 20, 1960 |
| 3,026,344 | Craven et al. | Mar. 20, 1962 |